USO05211698A

United States Patent [19]
Winfrey

[11] Patent Number: 5,211,698

[45] Date of Patent: May 18, 1993

[54] RAILROAD TRAIN BRAKING SYSTEM WITH A CONTINUOUSLY VENTING COUPLER

[76] Inventor: Gerald P. Winfrey, 101 W. James Ct., Kearney, Mo. 64060

[21] Appl. No.: 822,854

[22] Filed: Jan. 21, 1992

[51] Int. Cl.⁵ ............................................. B60T 11/26
[52] U.S. Cl. ........................................ 303/86; 303/47; 246/167 R; 246/169 R; 285/93; 137/559
[58] Field of Search ................. 303/25, 43, 47, 84.1, 303/86, 8, 9; 188/1.11, 151 A; 246/169 R, 167 R; 285/93, 13-14; 137/557, 559

[56] References Cited

U.S. PATENT DOCUMENTS

| | | | |
|---|---|---|---|
| 1,458,765 | 6/1923 | Kelly | 303/86 |
| 1,998,283 | 4/1935 | Mackert | 285/14 X |
| 2,855,247 | 10/1958 | Thompson | 246/169 R X |
| 4,487,060 | 12/1984 | Pomeroy | 246/169 R |
| 4,592,217 | 6/1986 | Fernandez et al. | 246/167 R X |
| 4,763,875 | 9/1988 | Chew | 303/47 X |
| 4,878,513 | 11/1989 | Ashby et al. | 303/69 X |

*Primary Examiner*—Robert J. Oberleitner
*Assistant Examiner*—Josie A. Ballato
*Attorney, Agent, or Firm*—Hovey, Williams, Timmons & Collins

[57] ABSTRACT

An improved railroad train braking system causes automatic braking of cars which have been isolated from the braking control of the engineer. A safety apparatus (18), having structure permitting discharge of pressurized air from the system at a predetermined rate, is coupled at the rearmost end of a train brake pipe (26). Pressurized air from the braking system of cars located rearwardly of a closed aircock is permitted to discharge from the system through the safety apparatus. Air distribution control valves (40) in the affected cars (14, 16) sense the reduction in pressure, and active the brakes (42).

15 Claims, 2 Drawing Sheets

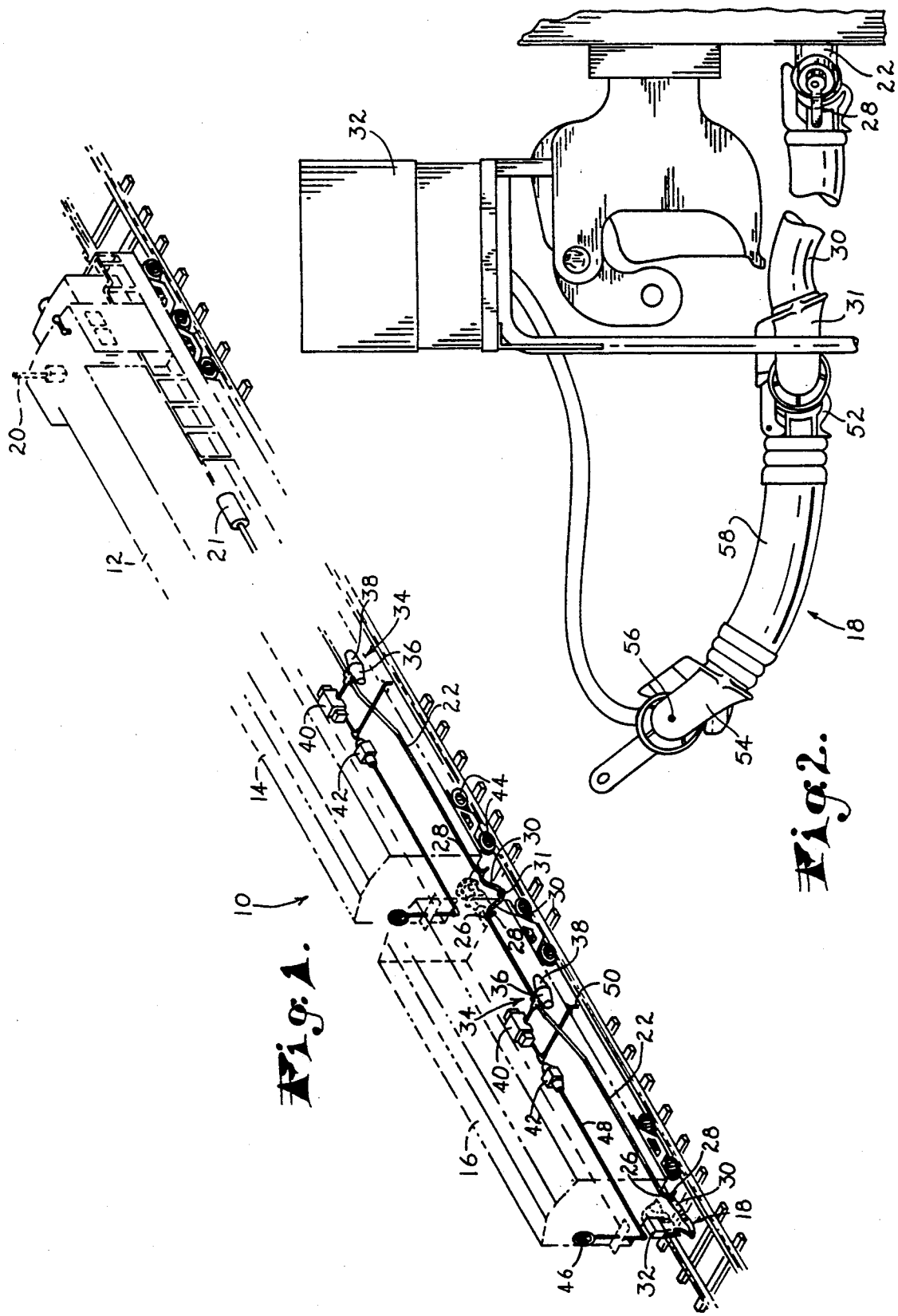

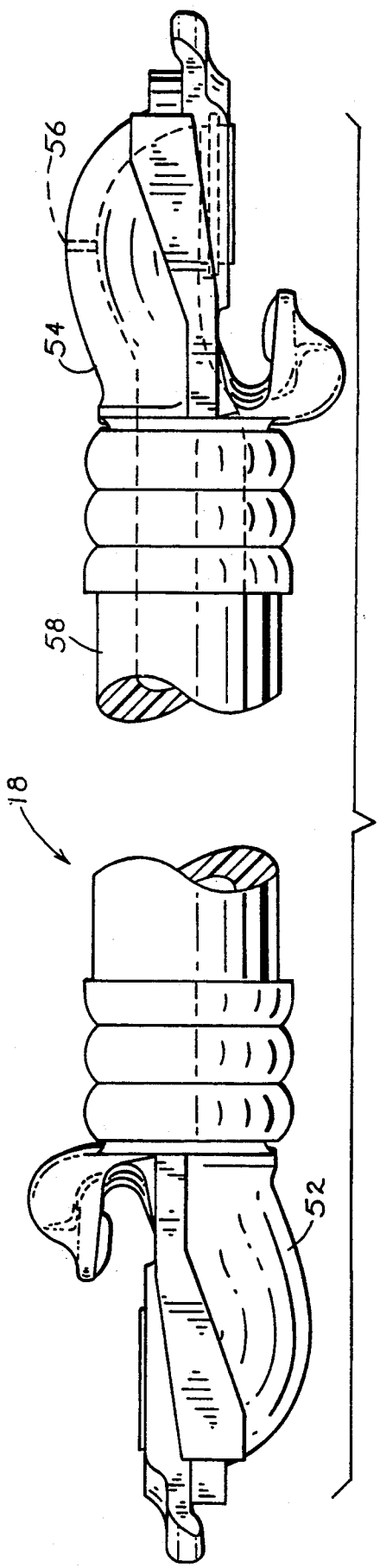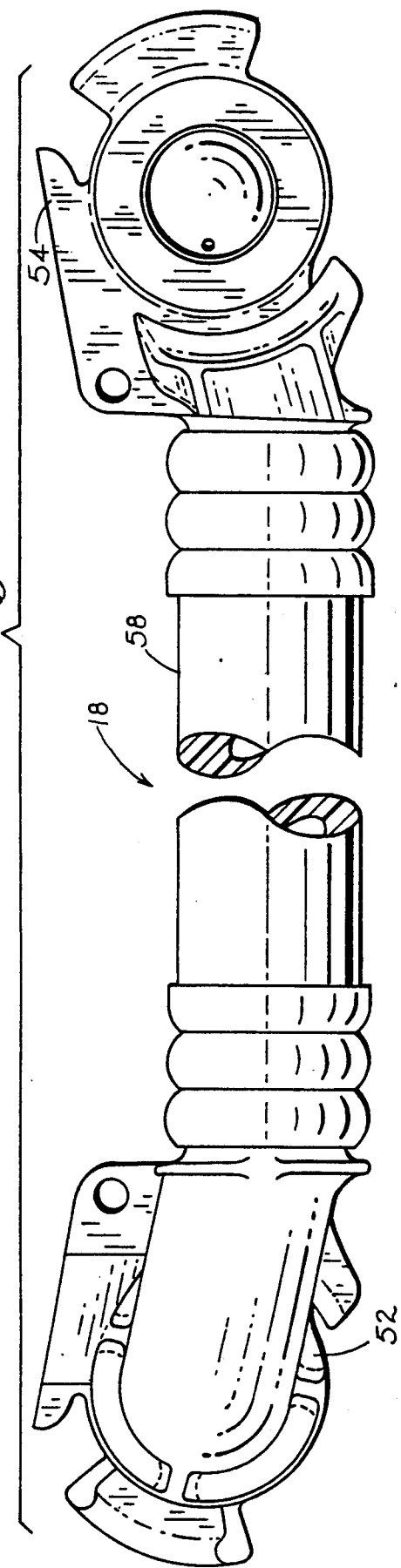

RAILROAD TRAIN BRAKING SYSTEM WITH A CONTINUOUSLY VENTING COUPLER

BACKGROUND OF THE INVENTION

1. Field of the Invention

The present invention is broadly concerned with an improved railroad train braking system for braking railroad cars which have been isolated from the braking control of the engineer. More particularly, it is concerned with a braking system in which a safety apparatus continuously discharges a small amount of pressurized air at a predetermined rate from the brake pipe of the last car of a train in order to set the brakes on a rearward portion of a train which has been isolated from control and make-up air of the locomotive.

2. Description of the Prior Art

Prior art railroad train braking systems include a source of compressed air located in the locomotive of the train controlled by a brake valve operable by the engineer for supplying and controlling air pressure conveyed by brake pipes extending along the lengths of the cars of the train. Two valves known as angle cocks are coupled with respective ends of the brake pipe of each car and flexible brake hoses intercouple the brake pipes of adjacent cars to form a continuous air conduit from the locomotive through the length of the train. When a caboose is not included as the last car in the train, an end-of-train device is coupled with the terminal brake hose of the last car which provides air pressure telemetry. This device senses the air pressure in the brake pipe of the last car and transmits a radio signal representative of the pressure to a receiver in the locomotive. In this way, the engineer can monitor the air pressure at the terminal end of the train.

As part of the braking system, each car also includes a reservoir which stores pressurized air for operating a brake cylinder which in turn operates to set or release the brake shoes of the car. The reservoir is divided into auxiliary and emergency compartments for providing pressurized air used in normal and emergency operations. The reservoir is charged with compressed air from the brake pipe through an air distribution control valve typically known as an "A/B valve." This valve also controls the application of air from the reservoir to the brake cylinder in response to brake pipe pressure signals initiated by the brake valve in the locomotive. In the past, it was normal for air leaks to exist in the train braking system especially at the "glad hand" couplers of the air hoses. In today's trains, however, air leaks are minimal. Nevertheless, the compressed air source in the locomotive is still available to provide make-up air as needed.

In order to brake the train, the engineer operates the brake valve in the locomotive which reduces the brake pressure in the brake pipes of the cars. This pressure reduction operates as an air signal to the A/B valves in each car. In response, the A/B valves release air from the reservoirs to the brake cylinders which applies the brakes on each car. When the engineer moves the brake valve to the released position, brake pipe pressure increases which signals the A/B valves to shift the brake cylinders to the released position. The reservoirs are then recharged with air from the brake pipe.

Emergency braking occurs upon a substantial reduction in brake pipe pressure, either because the engineer has moved the brake valve to the emergency position or because a break in the train has occurred. This reduction in pressure is sensed by the A/B valve in each car which then applies air from both auxiliary and emergency compartments to the brake cylinders causing full force application of the brake shoes against the wheels of the train.

The prior art train braking system discussed above presents a serious inherent problem. When a train is stopped at a crossing, for example, vandals have been known to close one or more of the angle cocks. When such occurs, the brake pipes of those cars downstream of the closed angle cock are isolated from the brake control in the locomotive. Furthermore, the air pressure in the isolated brake pipes is sealed therein which maintains the brakes of these cars in the released position. Moreover, the telemetry unit at the rear of the train is also isolated and cannot signal the locomotive that a problem exists. When the engineer next attempts to brake the train by reducing brake pipe pressure, only those cars forward of the closed cock receive the braking signal and the braking action of these forward cars may be insufficient to stop the train. In the past, this has resulted in "run away" trains and serious accidents. Even if the braking force is sufficient to stop the train, "run in" of the unbraked rearward cars into the forward cars occurs upon application of the brakes with possible car derailment.

SUMMARY OF THE INVENTION

The present invention overcomes the prior art problems previously outlined and provides a greatly improved railroad train braking system. More particularly, the braking system hereof prevents run away trains and unbraked car run in when a portion of the train braking system is isolated from locomotive control.

Broadly speaking, the braking system of the present invention includes a safety apparatus preferably coupled to the terminal end of the brake pipe of the last car of the train. This safety apparatus continuously exhausts air at a predetermined rate from the brake pipe of the last car and thereby from the braking system of the train. In normal operation the compressed air source from the locomotive compensates for the exhausted air, but if a rearward portion of the train becomes isolated from the locomotive due to a closed angle cock, for example, the air exhaust soon reduces the pressure in the isolated brake pipes which causes application of the brakes to the isolated cars. Additionally, the end-of-train device signals the engineer that an air pressure reduction has occurred thereby indicating a problem.

The preferred safety apparatus includes a flexible brake hose having a precisely dimensioned aperture defined therein configured to exhaust sufficient air for reliably applying the brakes to the isolated cars while preventing such a rapid reduction which would place these cars into an emergency braking situation. Other preferred aspects of the present invention are discussed herein.

BRIEF DESCRIPTION OF THE DRAWINGS

FIG. 1 is a fragmentary perspective view of a train having a braking system in accordance with the invention, with parts broken away for clarity and with certain parts in phantom;

FIG. 2 is a side elevational view of the preferred safety apparatus of the invention shown in position between the last car brake hose and the end-of-train device;

FIG. 3 is a side elevational view of the safety apparatus with portions of the connecting hose broken away, and with the preferred aperture in phantom; and FIG. 4 is a top plan view of the safety apparatus of FIG. 3.

DESCRIPTION OF THE PREFERRED EMBODIMENT

Referring now to the drawings, FIG. 1 illustrates railroad train 10 which includes locomotive 12, cars 14 and 16, and safety apparatus 18. Locomotive 12 includes telemetry receiver 20, and a source of compressed air 21 coupled with a brake valve (not shown) which in turn controls the application of air to brake pipes 22 of cars 14,16.

Brake pipes 22 extend along the length of each car 14,16, with each pipe 22 having a pair of opposed ends 24,26, with each end including a respective angle cock 28. Flexible brake pipe hoses 30 are respectively coupled to each of ends 24,26. Each hose 30 includes metal coupler 31 also known as a "glad hand" for coupling with an adjacent hose. End hose 30 of car 16 is coupled with safety apparatus 18, which in turn is coupled with the end-of-train air pressure sensor/telemetry device 32. In this manner, the compressed air source, the brake valve, brake pipes 22, hoses 30, and safety apparatus 18 form a continuous air conduit extending the length of train 10, terminating in end-of-train device 32.

Each car 14,16 includes air reservoir 34, internally divided into an auxiliary compartment 36 for normal braking operation and emergency compartment 38. An air distribution A/B valve 40 is coupled between reservoir 34 and brake cylinder 42. Cylinder 42 is remotely coupled with brake shoes (not shown) adjacent the wheels 44 of the train. Brake cylinder 42 is also coupled with hand brake 46 at the end of the car by means of hand brake rod 48, and with a manually operable release rod 50 which projects outwardly from the side of the car.

The preferred safety apparatus 18 of the present invention includes a pair of opposed metal couplers 52 and 54 with coupler 54 having aperture 56 defined therethrough and with flexible hose member 58 extending between couplers 52,54. Aperture 56 presents a diameter of one-eighth inch which is sized to exhaust air from brake pipe 22 at a rate sufficient to produce a four pound per minute drop in air pressure. As those skilled in the art appreciate, safety regulations prohibit operation of a train having a pressure drop which exceeds five pounds per minute. Thus, aperture 56 is preferably sized to exhaust air at less than the maximum allowable rate while also allowing for some air leakage in the system.

When a train is made up in accordance with the present invention, the brakes on the cars are initially set, adjacent hoses 30 are intercoupled, the angle cocks 28 on each car are opened, and apparatus 18 is coupled between the terminal hose 30 of the last car 16 and end-of-train device 46. The brake valve in the locomotive 12 is then operated to begin charging the system to the normal 90 psi operating pressure which also fills reservoirs 34 with air at this same pressure. The engineer verifies that the system is charged by monitoring the gauges in the locomotive and the pressure data supplied by end-of-train device 32. After the braking system is charged, the engineer then checks to ensure that make up air to the system does not exceed the allowable five pounds per minute. At this point, aperture 56 exhausts air at the rate to produce a four pound per minute drop in air pressure if no make up air is supplied from locomotive 12. The engineer then sets the brakes by operating the brake valve and the hand brakes 46 are released.

When the engineer activates the brake valve to charge the system as discussed above, pressurized air from the compressed air source in locomotive 12 flows into the brake pipes 22, through A/B valves 40, and into car reservoirs 34 until the system is fully charged to the pressure required by safety regulations (about 85–90 psi).

During normal operation of the train using the braking system of the present invention, the compressed air source in locomotive 12 provides sufficient make up air to maintain the system at the required operating pressure of about 90 psi. That is to say, the air source makes up for the air lost through aperture 56 and thereby maintains operating pressure within the system. When the engineer operates the brake valve to apply the brakes, the brakes in each car begin setting when the pressure in brake pipes 22 falls to about 83 psi. Continued operation of the brake valve further reduces pressure in the brake pipe and when this pressure falls to about 70 psi, the brakes in each car are fully set. In other words, at 70 psi A/B valves 40 are applying full air pressure from auxiliary compartments 36 to brake cylinders 42. The brakes are considered to be in an emergency braking mode at a brake pipe pressure less than 70 psi. When this occurs, A/B valves 40 also release air from emergency compartments 38 for application to brake cylinders 42.

If any of angle cocks 28 become closed, or if any other obstruction blocks passage of air through the braking system, the braking systems of those cars down stream of the blockage are isolated from control by the brake valve in locomotive 12. As discussed above, this has occurred in the past, for example, when vandals have closed an angle cock while the train is stopped at a crossing.

If a blockage occurs with the present invention, aperture 56 continues to exhaust air from the isolated rearward portion of the train at the rate of four pounds of pressure per minute. As discussed above, the brakes begin to set when brake pipe pressure is reduced from about 90 to about 83 psi. With the present invention this occurs in about 1.75 minutes or less, and the brakes continue to gradually set as the pressure drops until full application of the brakes occurs when the brake pipe pressure drops to about 70 psi. In other words, if a blockage occurs in brake pipes 22, full application of the brakes occurs in about five minutes or less with brake application beginning in less than two minutes. In this way, the brakes are applied promptly enough to prevent a run away train situation, but slowly enough to prevent an emergency application of the brakes which can cause derailments and other damage to the cars.

Additionally, end-of-train device 32 signals the engineer that the pressure reduction is occurring and that the brakes are beginning to set on rearward cars of the train. This alerts the engineer to a problem so that the brakes can be applied to the forward portion of the train. With the brakes already being set on the rearward portion of the train, "run in" to the forward cars is prevented when the brakes are applied by the engineer to these cars.

As those skilled in the art will appreciate, the present invention encompasses many variations in the preferred embodiment described herein. For example, a precisely dimensioned aperture could be included as an integral component of the end-of-train device.

Having described the preferred embodiment of the present invention, the following is claimed as new and desired to be secured by Letters Patent:

1. In a railroad train having a plurality of railroad cars and having an air brake system for braking the train during operation thereof including an air conveyance conduit extending along the length of the train and presenting respective forward and rearward ends and including an air supply source coupled with the conduit adjacent the forward end thereof, the source having an allowable make-up air capability, each car having an air brake mechanism coupled with the conduit and responsive to an air pressure reduction therein for braking the associated car, a method of operating the air brake system comprising the steps of:
   providing a safety apparatus having means configured for coupling with the conduit and means for continuously venting pressurized air therefrom at a controlled vent rate;
   coupling said safety apparatus with the conduit adjacent the rearward end thereof;
   continuously venting pressurized air during operation of the train from the conduit through said safety apparatus at a controlled vent rate less than the allowable make-up air capability of the air supply source;
   in the event of a blockage in the conduit, reducing the air pressure in the conduit rearward of the blockage by continuing to vent pressurized air therefrom by way of said safety apparatus; and
   actuating the braking mechanism of each of those cars coupled with the conduit rearward of said blockage in response to said reducing of the air pressure therein.

2. The method as set forth in claim 1, further including the step of configuring said safety apparatus to include structure defining an aperture as said means for continuously venting pressurized air at the controlled vent rate.

3. The method as set forth in claim 1, further including the steps of coupling an end-of-train telemetry device adjacent the rearward end of the conduit wherein said telemetry device includes means for sensing the air pressure in the conduit and for transmitting a wireless signal representative thereof, and transmitting a wireless signal representative said reduced air pressure in the conduit rearward of said blockage.

4. The method as set forth in claim 3, further including the step of coupling said safety apparatus between said conduit and said telemetry device.

5. The method as set forth in claim 4, further including the step of configuring said safety apparatus to include a tubular member presenting opposed ends, a first coupler connected to one of said ends for coupling with said conduit, a second coupler connected to the other of said end for coupling with said telemetry device, and structure defining an aperture in said safety apparatus as said means for continuously venting pressurized air at the controlled vent rate.

6. The method as set forth in claim 5, further including the step of configuring said safety apparatus to include said aperture defined through one of said couplers.

7. The method as set forth in claim 1, further including the step of configuring said safety apparatus so that said controlled vent rate reduces the pressure in the conduit at a rate of less than five p.s.i. per minute.

8. The method as set forth in claim 7, further including the step of configuring said safety apparatus so that said controlled vent rate reduces the pressure in the conduit at a rate of about four p.s.i. per minute.

9. In a railroad train having a plurality of railroad cars, an air brake apparatus for braking the train comprising:
   an air conveyance conduit extending along the length of the train and presenting respective forward and rearward ends;
   an air supply source coupled with the conduit adjacent the forward end thereof, said source having a make-up air capability;
   a plurality of air brake mechanisms respectively connected with cars, each mechanism including means for coupling with the conduit and for actuating in response to an air pressure reduction therein for braking the associated car;
   a safety apparatus having means for coupling with said conduit adjacent the rearward end thereof and means for continuously venting pressurized air therefrom during operation of the train at a controlled vent rate less than the allowable make-up air capability of said air supply source and, in the event of a blockage in the conduit, for reducing the air pressure in said conduit rearward of the blockage by continuing to vent pressurized air therefrom by way of said safety apparatus for actuating said braking mechanism of each of those cars coupled with said conduit rearward of said blockage in response to said reducing of the air pressure therein.

10. The apparatus as set forth in claim 9, said means for continuously venting pressurized air being configured so that said controlled vent rate reduces the pressure in said conduit at a rate of less than five p.s.i. per minute.

11. The apparatus as set forth in claim 10, said controlled vent rate being at a rate of about four p.s.i. per minute.

12. The apparatus as set forth in claim 9, further including an end-of-train telemetry device coupled with said conduit adjacent the rearward end thereof, said telemetry device including means for sensing the air pressure in said conduit and for transmitting a wireless signal representative thereof.

13. The apparatus as set forth in claim 12, further including means for coupling said safety apparatus between said conduit and said telemetry device.

14. The apparatus as set forth in claim 13, said safety apparatus including a tubular member presenting opposed ends, a first coupler connected to one of said ends for coupling with said conduit, a second coupler connected to the other of said end for coupling with said telemetry device, and structure defining an aperture in said safety apparatus as said means for continuously venting pressurized air at the controlled vent rate.

15. The apparatus as set forth in claim 9, said safety apparatus including a tubular member and at least one coupler for coupling with said conduit, and further including structure defining an aperture in said safety apparatus as said means for continuously venting pressurized air at the controlled vent rate.

* * * * *